United States Patent [19]

Badavas

[11] 4,106,607

[45] Aug. 15, 1978

[54] PNEUMATIC SAFETY SYSTEM FOR MACHINE ENCLOSURES

[75] Inventor: Charles Arthur Badavas, Allendale, N.J.

[73] Assignee: American Can Company, Greenwich, Conn.

[21] Appl. No.: 773,497

[22] Filed: Mar. 2, 1977

[51] Int. Cl.$^2$ ............................................. G08B 1/04
[52] U.S. Cl. .................................. 192/129 B; 116/70; 192/135
[58] Field of Search .............. 192/129 B, 135; 100/53; 83/DIG. 1; 116/65, 70, 114 P, 86; 49/13

[56] References Cited

U.S. PATENT DOCUMENTS

| 2,043,126 | 6/1936 | Stengel | 116/70 |
| 3,055,289 | 9/1962 | Komph, Sr. | 100/53 |
| 3,730,296 | 5/1973 | Huigens | 100/53 |
| 3,805,658 | 4/1974 | Scott et al. | 192/135 X |

Primary Examiner—James F. Coan

Attorney, Agent, or Firm—Robert P. Auber; George P. Ziehmer; Ira S. Dorman

[57] ABSTRACT

An enclosure, for example, a safety enclosure around noisy or potentially dangerous machinery, includes a door which, when opened, stops the operation of the machine to prevent injury to personnel who may examine or maintain the machine. A pneumatic safety system for the door includes, in series, a source of compressed air, an air regulator valve, a series of disconnectable air connectors and a transducer, such as an air pressure limit switch, which converts a decrease in air pressure into a control signal to stop the operation of the machine. One air connector member is mounted on the door and another on the door frame, so that they are automatically disconnected when the door is opened, thereby opening the pneumatic line and causing the air pressure to decrease. The connector members each have a flat face which meet in a flush relationship, one connector member having a round orifice and the other connector member having a multi-slotted orifice which leads to an internal air cavity.

11 Claims, 12 Drawing Figures

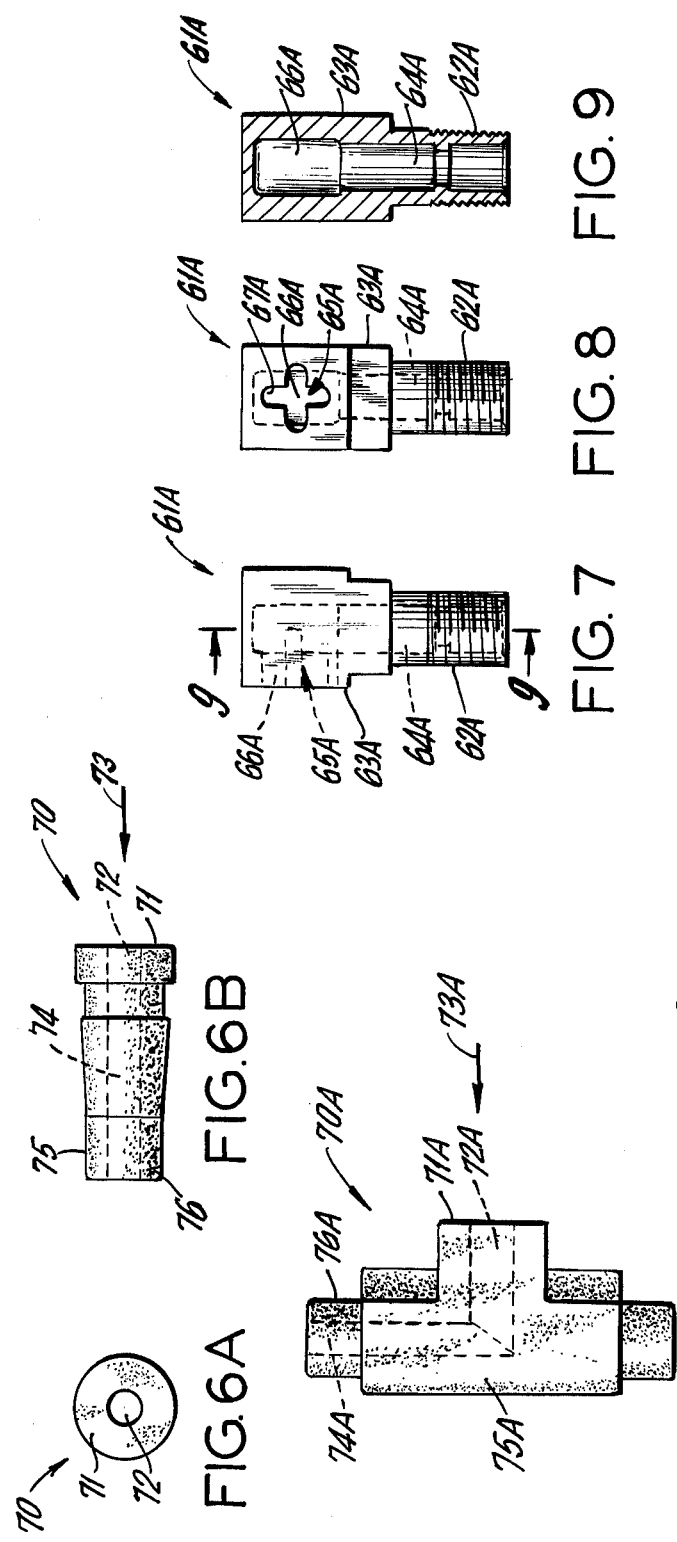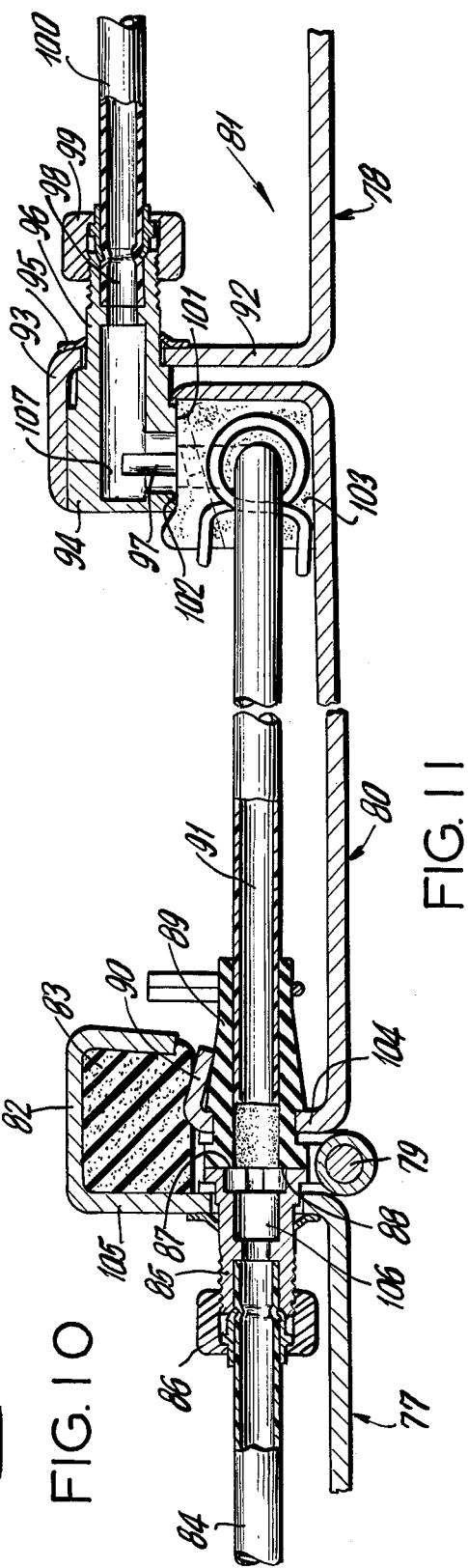

PNEUMATIC SAFETY SYSTEM FOR MACHINE ENCLOSURES

BACKGROUND OF THE INVENTION

The present invention relates to safety systems to shut off machinery when a door of a machinery enclosure is opened, and more particularly to a pneumatic safety system.

At the present time there is an increased emphasis on enclosing machines within a noise-reduction enclosure to aid the health and safety of workers within a factory. Regulations issued under the United States Occupational Health and Safety Act, known as OSHA, have set standards regarding the noise levels within areas of a factory. It may be either costly or impossible in many cases to redesign machines, such as presses, so that the machines will meet the relatively low noise levels required by OSHA.

One suggested solution has been to enclose the noisy machines within a noise-reducing enclosure. For example, U.S. Pat. No. 3,860,086, issued Jan. 14, 1975 to Mahajan et al, discloses an enclosure housing comprised of removable panels. That patent points out that many machines require ready access and attention to ensure smooth operation. However, that patent does not disclose any safety measure by which removal of one of the panels will cause the machine to shut down in order to protect the worker during maintenance or repair operations.

At the present time there is a continued interest in improving equipment to protect the safety of personnel who inspect or service the machinery, which is placed in a noise-reduction enclosure. Those machines must still be serviced, for example, upon malfunction, for cleaning, inspection, repairs, oiling, and other maintenance. If the enclosure door is opened while the machine is still operating, the employee may possibly be injured.

A series of safety devices, sometimes called "interlock devices," have been suggested to automatically shut off a machine when a door to its enclosure is opened. However, certain of these interlock devices present various difficulties in operation. For example, if the interlock device is a series electrical circuit having switch contacts at the enclosure door, the switch or other circuit component may fail and the relay which shuts off the machine may fail to be operated. In addition, repair personnel may readily defeat an electrical safety system by jumping the switch with wires. Although the safety interlock system may have been installed to protect the health of the employees, it has been found that they may short-circuit or otherwise defeat a safety system for what they believe is their convenience.

As another example, a safety interlock system has been suggested in which magnetically operated electrical reed switches in a door frame are closed by magnets in the door. However, that reed relay system is easily defeated by placing a loose magnet on the reed switch when the door is opened.

The present invention utilizes a pneumatic safety system for the doors of an enclosure. The use of pneumatic safety or alarm systems has been suggested in prior art patents. U.S. Pat. No. 583,405, entitled "System of Pneumatic Doors and Gratings," issued May 25, 1897, describes a pneumatic system for prisons and vaults in which a door frame member is part of an air valve, described as a "valve joint." When the door is opened air from a reservoir escapes through the opened valve at the door and sets off an electric alarm. The "valve joint" of the 583,405 patent is limited to a hinged door and is not applicable to a sliding panel or a sliding door. In addition, the system may be defeated by inserting the round nozzle of an air hose into the round port "g" of the air pipe.

U.S. Pat. No. 3,921,563, entitled "Pneumatic Alarm System" and issued Nov. 25, 1975, describes a fire and burglar alarm system using a pressurized gas container connected to a gas line. The gas line is connected to rupturable sensors which, when broken by fire or opening a door or a window, permit release of the gas, setting off an alarm. The sensors are "one-shot," i.e., they must be replaced after they are ruptured. The system is not applicable to an enclosure in which the doors may be opened many times a day and where each time the door is opened it is desired to shut off the machine within the enclosure.

SUMMARY OF THE INVENTION

In accordance with the present invention, a pneumatic safety interlock system is provided for an enclosure. The pneumatic system, unlike electrical systems, may be used in combustible or wet environments, for example, in the presence of combustible dusts. The pneumatic system includes connectors which, when detached upon opening an enclosure door, permit the flow of air from the system. The decrease in air pressure operates a pressure sensitive transducer which produces a control signal to shut off the machine within the enclosure.

The two connector members each have a flat face so that, when pushed together by the closing of the door, they are flush to one another and may be slightly misaligned relative to each other. One connector is of rubber, or other flexible material, and has a round orifice. The other connector, preferably of metal, has an internal cavity and a multi-slotted orifice. That construction permits some misalignment of the two connector members as the round orifice may be next to any one, or two, of the slots. In addition, and more importantly, one cannot defeat the system by inserting a round compressed air hose or nozzle into the slotted connector member because its cavity size and slot configuration will insure that sufficient air will be lost to operate the pressure sensitive transducer and the machinery will be shut off.

OBJECTIVES AND FEATURES OF THE INVENTION

It is an objective of the present invention to provide a pneumatic safety system for machine enclosures which may be utilized in wet environments or in environments having combustible materials.

It is a further objective of the present invention to provide such a safety system which has means to prevent personnel from defeating the safety system by insertion of an air hose.

It is a further objective of the present invention to provide such a pneumatic safety system which, in the event of failure of any of its air lines or of the compressor or any of its air connectors, will cause the machine within the machine enclosure to be shut off.

It is a further objective of the present invention to provide such a pneumatic safety system in which the air lines may be of conventional and relatively inexpensive material, for example, copper tubing, and the air connectors may be of relatively simple design so that they may be readily and relatively inexpensively manufactured.

It is a further objective of the present invention to provide such a pneumatic safety system in which the air connectors are designed to be readily attached to the door frames and doors of the machine enclosures and to permit some degree of misalignment between its two mating connector members.

It is a feature of the present invention to provide a pneumatic safety system for an enclosure. The enclosure comprises a first portion, such as a wall and door frame, and a second portion, such as a door, which are movable into open and closed positions. A source of compressed air, such as a compression pump and storage tank, is connected to a first air line. A transducer means, such as a low pressure limit switch, converts a decrease in air pressure into a control signal and is connected to a second air line.

A first air connector member, of a two-member connector set, is connected to one of said air lines and mounted on the first enclosure portion. It comprises a body portion preferably of rubber or other resilient material, a bore through the body portion which is connected to one of the air lines, a flat face portion, and a round orifice in the flat face portion leading to the bore.

The second air connector member is connected to the second air line and mounted on the second enclosure portion. It comprises a body portion, preferably of metal, a bore partly through the body portion, and an air cavity within the body portion and connected to the bore. The cross-sectional area of the cavity, measured perpendicular to the direction of air flow, is greater than the cross-sectional area of the orifice of the first air connector member. The second air connector member has a flat face having a central opening and a plurality of slots extending therefrom, the slots and central opening providing air passages to the cavity.

BRIEF DESCRIPTION OF THE DRAWINGS

Other objectives and features of the present invention may be ascertained from the detailed description provided below, which gives the inventor's best presently known mode of practicing the invention. The detailed description should be taken in conjuction with the accompanying drawings, in which:

FIG. 6A is a front plan view of a flexible connector member which is adapted to mate with the connector member of FIG. 3;

FIG. 6B is a side plan view of the connector member of FIG. 6A;

FIG. 7 is a side plan view of a right-angle metal connector member;

FIG. 8 is a front plan view of the metal connector member of FIG. 7;

FIG. 9 is a cross-sectional view taken along lines 9—9 of FIG. 7 and illustrating a cross-section of the metal connector member of FIG. 7;

FIG. 10 is a side plan view of a flexible connector member which is adapted to mate with the metal connector members of FIGS. 7-9; and FIG. 11 is a top cross-sectional view of an enclosure door pivotally mounted on its door frame.

DETAILED DESCRIPTION OF THE INVENTION

Figure 1:
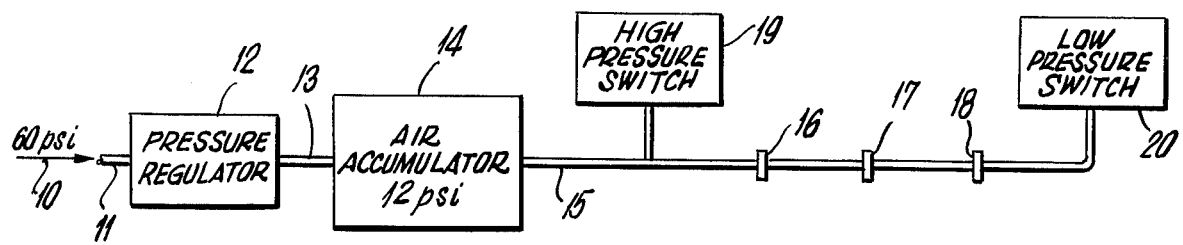
FIG. 1 is a schematic diagram of one embodiment of the pneumatic safety system of the present invention.

As shown in FIG. 1, a preferred embodiment of the present invention includes a source of air pressure 10, for example, of 60 pounds per square inch, connected to a first air line 11. The air line 11 leads to an adjustable pressure regulator 12. The pressure regulator 12 provides at its output orifice a regulated amount of air pressure to a second air line 13. For example, the pressure regulator 12 may be set to provide 12 pounds per square inch of air pressure.

The air line 13 is connected to an air accumulator 14 which provides a steady source of air at a preselected pressure, for example, 12 pounds per square inch. The air accumulator 14 is connected to a third air line 15. The third air line 15 has a series of air connectors 16, 17 and 18 connected in series along the line 15. The air connectors 16-18 are positioned at doors in an enclosure and are further described below. A high pressure limit switch 19 is connected to the air line 15 upstream of air connector 16, and a low pressure limit switch 20 is connected at the end of the air line 15, i.e., downstream, after the series of air connectors 16, 17 and 18.

The high pressure limit switch 19 may be set at a predetermined limit, for example, in this case, 15 p.s.i. If the pressure in line 15 exceeds 12 p.s.i., the high pressure limit switch 19 will provide a control signal. For example, the high pressure limit switch 19 may be a pneumatic-electric transducer which provides an electrical signal which operates a relay and shuts down the machine within the enclosure, or may provide a visual or audible alarm. The visual or audible alarm may be provided in addition to the shutting down of the machine within the enclosure. The high pressure limit switch 19 may prevent defeat of the system of the present invention by personnel interested in turning off the safety system. If they apply a high pressure air hose to the air line 15, in an attempt to not set off the low pressure limit switch 20, even though one or more of the air connectors 16, 17 and 18 have been opened, the high pressure limit switch 19 will be activated and safely shut off the machine.

The low pressure limit switch 20 may be preset at a selected low air pressure, for example, 3 p.s.i. When the pressure in line 15, reaching the low pressure limit switch 20, falls below the set low limit (in this example 3 p.s.i.), the low pressure limit switch 20 will produce a control signal. For example, the low pressure limit switch 20 may be a pneumatic-electric transducer which provides an electrical signal opening a relay and shutting off the machine within the enclosure when the pressure to the low pressure limit switch falls below the selected minimum pressure.

Figure 2:
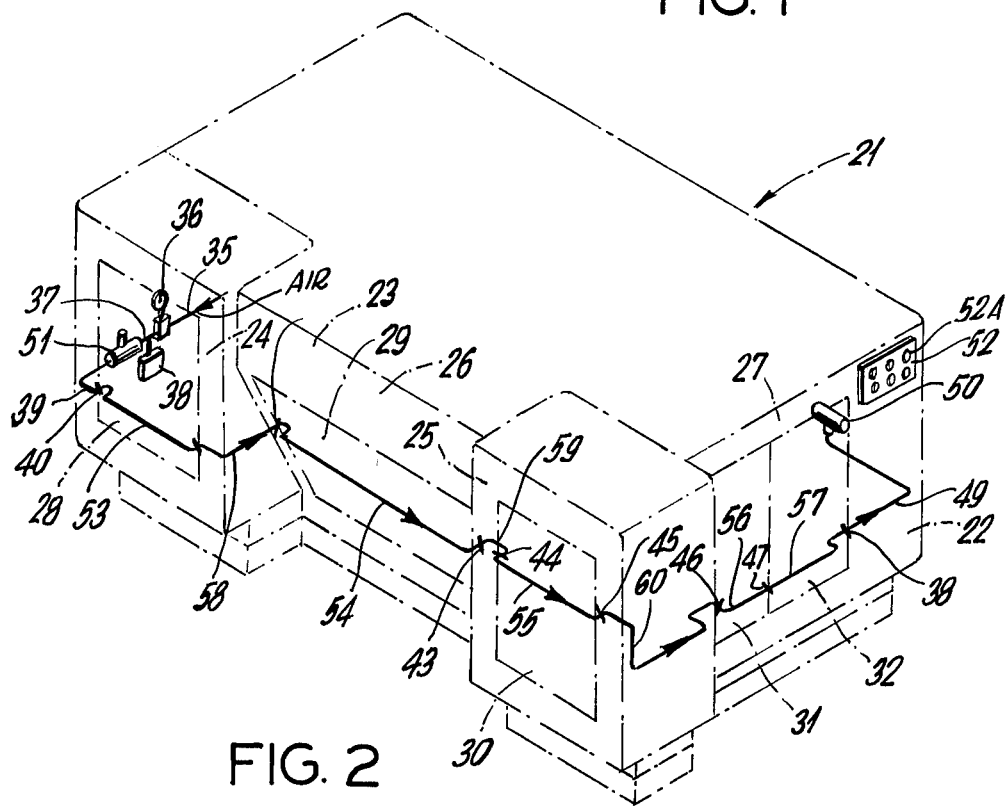
FIG. 2 is a perspective view of an enclosure for a machine utilizing the pneumatic safety system of the present invention in which the lines and connectors of the pneumatic safety system are seen as if the enclosure walls and doors were transparent.

FIG. 2 illustrates the utilization of the pneumatic safety system of the present invention on a machine noise and safety enclosure. The machine enclosure 21 encloses what would otherwise be a noisy or possibly unsafe machine (not shown). The enclosure 21 comprises walls 22 and 23, and a series of door frames 24, 25 and 26 mounted on, or integral with, the walls 22 and 23. Each of the door frames 24, 25 and 26 has a door 28, 29 and 30 hingedly mounted thereon by hinges (not shown).

The door 28 is pivotally fixed, by hinge means, within the door frame 24 and swings to the side and outwardly. The door 29 is pivoted, by hinge means, at its bottom edge and swings in an arc downwardly to open and upwardly to close within the door frame 26. The door 30 is pivotally mounted, by hinge means, and swings sidewise within the door frame 25. Two oppositely swinging and outwardly to-the-side opening doors 31 and 32 are pivotally mounted within the door frame 27.

In the pneumatic safety system illustrated in FIG. 2, an air accumulator is not employed, but rather the air flows directly from a source of compressed air (not shown) into the air line 35, for example, at 60 p.s.i. The air line 35 leads to an air pressure regulator 36 which may be set at 15 p.s.i. The pressure regulator 36 is connected to an air line 37 which leads to the high pressure limit switch 38. The high pressure limit switch 38 may be a modified two-way normally closed valve. When the normally closed valve is opened by an excess of pressure over the preselected limit, for example, 20 p.s.i., the high pressure limit switch 38 will provide an electrical signal to shut off the machine within the machine enclosure 21.

The high pressure limit switch 38 is connected to a third air line 39 which leads to the first of a plurality of series connected air connectors. The first of this series of air connectors is the air connector 40 which is at the left openable side of the door 28, and the second of these air connectors 41 is at the right pivotable side of the door 28. An air connector 42 is positioned at the left side of the door 29 and another air connector 43 is positioned at the right side of the door 29. Similarly, the door 30 has an air connector 44 at its left openable side and air connector 45 at its right pivotable side.

The door 31 has an air connector 46 at its left pivotable side and an air connector 47 at its right openable side. The air connector 47 is common to the right side of door 31 and the left side of the door 32 and a further air connector 48 is connected at the right pivotable side of the door 32. The final air connector of the series, i.e., air connector 48, is connected by means of air line 49 to the low pressure limit switch 50.

The low pressure limit switch 50 is an air pressure switch which is settable at a low air pressure, for example, 3 p.s.i. When the pressure falls below the preset pressure, the low pressure limit switch 50 generates an electrical control signal which shuts off the machine within the machine enclosure 21. The same control signal may also trigger an audible or visual alarm. The machine enclosure 21 also includes a control panel 52 having a reset button 52A. The reset button 52A will reset the solenoid valve 51. The solenoid valve 51 is set by the same control signal which shuts down the machine. The solenoid valve 51 is a normally open two-way valve which is closed by the control signal to prevent a useless escape of air after the machine has been shut down.

Each of the air connectors 40–48 is connected to two air lines, an entry line and an exit line, so that each of the air connectors 40–48 is in series between the pressure regulator 36 and the low pressure limit switch 50. Each of the air connectors 40–48 consists of two connector members, one of the connector members being attached to the door frame and the other connector member being attached to the door. For example, the door 28 has an air line 53 which connects one of the connector members of air connector 40 to the other connector member of air connector 41. Similarly, air line 54 is attached to door 29 and to the air connectors 42 and 43; air line 55 is attached to door 30 and to the air connectors 44 and 45; air line 56 is attached to door 31 and to the connectors 46 and 47; and air line 57 is attached to door 32 and to the air connectors 47 and 48. In the same manner, there are air lines attached to the internal walls of the enclosure between each of the fixed air connector members. An air line 58 is attached to the wall of the enclosure 21 and to the connectors 41 and 42. Similarly, an air line 59 is attached to the inner wall of enclosure 21 and to the connectors 43 and 44, and an air line 60 connects the connectors 45 and 46.

Figure 3:
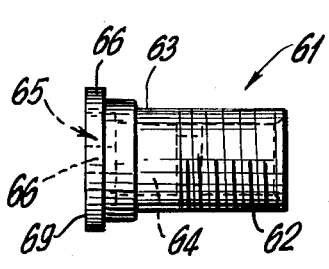
FIG. 3 is a side plan view of a metal connector member utilized in the pneumatic safety system of the present invention.
Figure 4:
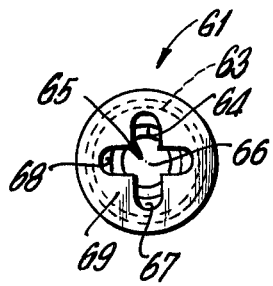
FIG. 4 is a front plan view of the metal connector member of FIG. 3.

An air connector member 61 is illustrated in FIGS. 3 and 4 and is preferably of a rigid material such as a bronze investment casting or other metal. The configuration of the member 61 will vary, depending on its orientation in respect to its nipple portion 62. The nipple portion 62 is a tubular member having external screw threads. As shown in FIGS. 3 and 4, the nipple 62 enters the body portion 63 along a straight axis. The body portion 63 has an internal air cavity 64. The openings to its internal cavity 64 are through the nipple 62, which leads to an air line, and through the orifice 65 of the top portion of the connector member 61. The connector member 61 has a flat face 69 at its outer end.

As shown in FIG. 4, the orifice 65 is not a simple round orifice. Rather, the orifice 65 comprises an open central portion 66 and two slots 67 and 68 extending therefrom. The slots 67 and 68 have round-shaped ends as viewed in the top plan view of FIG. 4. The slots 67 and 68 are at right angles to each other and extend beyond the central portion 66 at both sides of the central portion 66. The slots and central portion form a right-angled cross or, described in other words, a four-ray star.

Figure 5:
FIG. 5 is a front plan view of an alternative metal connector member.

An alternative embodiment of the orifice is illustrated in FIG. 5. As shown in FIG. 5, there are four slots, each of which passes through and forms an open central portion 66B. The four slots, when viewed in the plan view of FIG. 5, form an eight-ray star having a common center.

FIG. 6 shows the second connector member 70 of the pair of connecting members which is used with the connector member 61 of FIGS. 3 and 4. The connector member 70 is preferably made of a resilient material such as rubber or neoprene rubber. The connector member 70 has a flat front face 71 which is adapted to lie flush against the flat front face 69 of the connector member 61 when the door is in its closed position. The front face 71 has an orifice 72 which is round in cross-section when viewed in the direction of arrow 73. The orifice cross-sectional area is less than the cross-sectional area of the air cavity 64, for example, both areas being measured perpendicularly to the direction of air flow. The orifice 72 is in communication with the bore 74, round in cross-section, which extends through the body portion 75 of connector member 70. The rear end of the body portion 75 consists of a nipple portion 76 which is adapted to engage an air line.

An alternative pair of connector members is shown in FIGS. 7-10. This pair of connector members is similar to the pair of connector members shown in FIGS. 3, 4, 6A, 6B in that one connector member 70A is of resilient material and the other connector member 61A of the pair is of metal. In both connector members 70A and 61A the axis of the entry orifice is at a 90° (right) angle to the axis of the exit orifice. In other words, both connector members 61A and 70A are right-angled members.

The metal connector member 61A has a tubular nipple portion 62A, a body portion 63A, an internal air cavity 64A, an orifice 65A through its top portion, the orifice comprising a central portion 66A, and slots 67A, 68A extending therefrom. The resilient connector member 70A has a flat front face 71A with a round orifice 72A when viewed in the direction of arrow 73A. The body portion 75A of connector member 70A has a bore 74A, round in cross-section, and a round nipple portion 76A which fits into an air line.

The method of mounting the air connectors described in the present invention is illustrated in FIG. 11. As shown therein, a door 80 is positioned within a door frame 81 having, as viewed in FIG. 11, a left post 77 and a right post 78. A hinge 79 is connected to the flange of the door 80 and is also connected to the flange 105 of the left post 77. An inverted U-shaped extension 82 of the left post 77 positions and holds a sound-absorbent flexible material 83.

An air line 84, connected in series with a source of compressed air, is attached to the metal air connector member 85 by means of bushing 86. The metal air connector 85 has an internal air cavity 106 and a front face 87 which lies flush with the front face 88 of the resilient air connector member 89. The resilient air connector 89 is held by a lip 90 of the door flange 104. An air line 91 is inserted in the end of the flexible air connector 89 in the end opposite its front face 88.

The right post 78 has an integral flange 92 and a lip 93. A metal air connector member 94 is held against the lip 93 by means of fastener member 95 which is secured onto the air connector member 94 at its portion 96 which protrudes through a hole in the flange 92. The metal air connector member in this case is an angled member in the sense that the axis of its entry orifice 97 is at right angles to the axis of its exit orifice 98. The entry orifice 97 is of the shape illustrated in FIG. 4 and communicates with the air cavity 107 within the body portion of the connector member 94.

A bushing 99 connects the air line 100 to the metal connector member 94. The front face 101 of the metal air connector 94 lies flush with the front face 102 of the resilient air connector 103 when the door is tightly closed. The resilient air connector 103 is not of the type illustrated in FIG. 6, but rather is a right-angled member in the sense that the axes of its entry and exit orifices are at right angles to each other. This type of right-angled resilient air connector member 103 is illustrated in FIG. 10. The air line 91 is connected to the resilient air connector member 103.

In operation, when the door 80 is pivoted on its hinge 79 and opened, the front face 87 of the metal air connector 85 is separated from the front face 88 of the resilient air connector 89, permitting an escape of air through the air line 84 and out of the connector member 89. This lowering of air pressure will operate the low-pressure limit switch 20, producing a control signal to shut off the machine within the enclosure. In addition, there is a loss of air pressure when the face-to-face flush relationship is broken between the resilient air connector 103 and the metal air connector 94 upon opening of the door 80.

The machine within the enclosure may be started only if the air pressure within the pneumatic lines is restored by closing the door 80 and joining the two members of each of the air connectors. In other words, when the door 80 is closed, the faces 87 and 88 of the respective air connectors are placed in a face-to-face air sealed relationship and similarly the air connectors 103 and 94 are joined in a sealed relationship, permitting air flow from line 84 through line 91 and through line 100.

Modifications may be made in the above-described embodiment within the scope of the following claims. For example, although the description is of a pneumatic system using compressed air, the terms "compressed air" and "air line", as used herein, are to be considered as referring to other types of gases, such as nitrogen, under pressure in a pneumatic system.

What is claimed is:

1. A pneumatic safety system comprising an enclosure having a first and second enclosure portions, which enclosure portions are movable into open and closed positions relative to each other, a source of compressed gas connected to said enclosure, a first gas line connected to said source of compressed gas, transducer means connected to said enclosure to convert a decrease in gas pressure into a control signal, a second air line connected to said transducer means, a first gas connector member mounted on said first enclosure portion, said first gas connector member comprising a body portion, a bore through said body portion and connected to either one of said first or second gas lines, a flat face portion on said body portion and a round orifice in said flat face portion leading to said bore, a second gas connector member mounted on said second enclosure portion, said second gas connector member comprising a body portion, a bore partly through said body portion and connected to said other of said first and second gas lines, a cavity within said body portion and connected to said bore, the cross-sectional area of said cavity perpendicular to the direction of gas flow therein being greater than the cross-sectional area of said orifice of said first gas connector member, said second gas connector member having a normally flat face portion which is in gas sealing relationship relative to said flat face portion of said first connector member in the closed position of said enclosure portions, said flat face portion having a central opening and a plurality of slots extending from said central opening, said slots and central opening providing a gas passage to said cavity.

2. A pneumatic safety system as in claim 1 wherein said slots of said second gas connector member are four connecting slots forming a right-angled cross as viewed in plan view looking at said face.

3. A pneumatic safety system as in claim 1 wherein said second gas connector member has eight slots in a star formed in its flat face portion.

4. A pneumatic safety system as in claim 1 wherein said second gas connector member is made of metal.

5. A pneumatic safety system as in claim 4 wherein said metal is copper.

6. A pneumatic safety system as in claim 1 wherein said first gas connector member is of a resilient material.

7. A pneumatic safety system as in claim 6 wherein said resilient member is rubber.

8. A pneumatic safety system as in claim 1 wherein said first enclosure portion includes a frame, a wall and a door frame mounted on said wall, said first gas connector member being mounted on said door frame, and wherein said second enclosure portion is a door pivotally fixed to said door frame by hinge means and said second gas connector member is mounted on said door.

9. A pneumatic safety system for an enclosure, said enclosure comprising a wall, a door frame and a door which is pivotally movable by hinge means into open and closed positions relative to said door frame, a source of compressed air connected to said enclosure; a first air line connected to said source of compressed air; a pressure regulator connected to said first air line; an air accumulator connected to said pressure regulator; a high-pressure limit switch and a low-pressure limit switch, which low-pressure limit switch converts a fall in air pressure into a control signal; a second air line connecting said pressure regulator and said air accumulator; a third air line connecting said air accumulator, said high pressure limit switch and said low pressure limit switch;

a first air connector connected in series with said third air line and mounted on either one of said door or said door frame, said first air connector comprising a body portion, a bore through said body portion, a resilient flat face portion on said body portion, and a round orifice in said resilient flat face portion leading to said bore;

a second air connector member connected in series with said third air line and mounted on said other one of said door and said door frame, said second air connector member comprising a body portion, a bore partly through said body portion, a cavity within said body portion and connected to said bore, the cross-sectional area of said cavity perpendicular to the direction of air flow being greater than the cross-sectional area of said orifice of said first air connector member;

said second air connector member having a metal normally flat face portion which is in air sealing relationship against said flat face portion of said first connector member in the closed position of said door, said flat face portion having a central opening and a plurality of slots extending from said central opening, said slots and central opening providing an air passage to said cavity.

10. A pneumatic safety system as in claim 9 wherein said slots of said second air connector are four connected slots forming a right-angled cross as viewed in plan view looking at said face.

11. A pneumatic safety system as in claim 9 wherein said second air connector has eight connected slots in a star form through its said flat face.

* * * * *

UNITED STATES PATENT OFFICE
CERTIFICATE OF CORRECTION

Patent No. 4,106,607        Dated August 15, 1978

Inventor(s) Charles Arthur Badavas et al.

It is certified that error appears in the above-identified patent and that said Letters Patent are hereby corrected as shown below:

On the title page in item [75] the following should be added:

-- Donald O. Johnson, Matawan, N. J. --.

Signed and Sealed this

Tenth Day of April 1979

[SEAL]

Attest:

RUTH C. MASON
Attesting Officer

DONALD W. BANNER
Commissioner of Patents and Trademarks